United States Patent
Irwin et al.

(10) Patent No.: US 7,496,540 B2
(45) Date of Patent: Feb. 24, 2009

(54) SYSTEM AND METHOD FOR SECURING DIGITAL CONTENT

(75) Inventors: Scott Andrew Irwin, Winter Springs, FL (US); Robert Dennis Birch, Orlando, FL (US); Joseph Paul Lupo, Apopka, FL (US); Stephen DeWayne Weagraff, Orlando, FL (US)

(73) Assignee: Convergys CMG Utah, Salt Lake City, UT (US)

( * ) Notice: Subject to any disclaimer, the term of this patent is extended or adjusted under 35 U.S.C. 154(b) by 1167 days.

(21) Appl. No.: 10/643,712

(22) Filed: Aug. 19, 2003

(65) Prior Publication Data

US 2005/0044016 A1   Feb. 24, 2005

Related U.S. Application Data

(63) Continuation-in-part of application No. 10/392,496, filed on Mar. 20, 2003.

(60) Provisional application No. 60/367,964, filed on Mar. 27, 2002, provisional application No. 60/375,455, filed on Apr. 25, 2002, provisional application No. 60/414,122, filed on Sep. 27, 2002.

(51) Int. Cl.
  *H04K 1/00* (2006.01)
  *H04L 9/00* (2006.01)

(52) U.S. Cl. ............... 705/59; 705/51; 705/50; 705/58; 705/57; 705/64; 705/65; 705/66; 705/69

(58) Field of Classification Search .............. None
See application file for complete search history.

(56) References Cited

U.S. PATENT DOCUMENTS

| | | | |
|---|---|---|---|
| 5,325,418 A | 6/1994 | McGregor et al. | |
| 5,500,890 A * | 3/1996 | Rogge et al. ............. | 379/91.02 |
| 5,577,100 A | 11/1996 | McGregor et al. | |
| 5,619,247 A | 4/1997 | Russo | |
| 5,625,669 A | 4/1997 | McGregor et al. | |
| 5,631,947 A | 5/1997 | Wittstein et al. | |
| 6,138,004 A | 10/2000 | McGregor et al. | |
| 6,182,054 B1 | 1/2001 | Dickinson et al. | |
| 6,198,915 B1 | 3/2001 | McGregor et al. | |
| 6,199,047 B1 | 3/2001 | Dimino et al. | |
| 6,208,998 B1 | 3/2001 | Marcus | |

(Continued)

OTHER PUBLICATIONS

Security Gets Smarter, Australian Banking and Finance, vol. 10, No. 19, First Charlton Communications Pty Ltd. Oct. 31, 2001.*

(Continued)

*Primary Examiner*—Andrew J. Fischer
*Assistant Examiner*—Joshua Murdough
(74) *Attorney, Agent, or Firm*—Frost Brown Todd LLC

(57) ABSTRACT

A system is disclosed for a digital rights management system which enforces license rights by incorporating a decryption key in a license rights package that further includes an account number associated with a primary consumer. The digital rights management system also includes a mechanism for renewing/updating the license by charging the account number associated with a primary consumer. This way, the consumer may transfer the license rights package along with the digital content to any personal devices he likes but he is discouraged from freely disseminating the license package as uses by other consumers will be debited against his package or, if renewed/extended, charged against his account.

2 Claims, 9 Drawing Sheets

U.S. PATENT DOCUMENTS

| | | | |
|---|---|---|---|
| 6,230,148 B1 * | 5/2001 | Pare et al. | 705/40 |
| 6,230,188 B1 | 5/2001 | Marcus | |
| 6,237,145 B1 | 5/2001 | Narasimhan et al. | |
| 6,240,401 B1 | 5/2001 | Oren et al. | |
| 6,243,574 B1 | 6/2001 | McGregor et al. | |
| 6,295,528 B1 | 9/2001 | Marcus et al. | |
| 6,353,795 B1 | 3/2002 | Ranjan | |
| 6,381,316 B2 | 4/2002 | Joyce et al. | |
| 6,385,596 B1 | 5/2002 | Wiser et al. | |
| 6,434,238 B1 | 8/2002 | Chaum et al. | |
| 6,442,544 B1 | 8/2002 | Kohli | |
| 6,443,574 B1 | 9/2002 | Howell et al. | |
| 6,449,042 B1 | 9/2002 | Hamann | |
| 6,460,072 B1 | 10/2002 | Arnold et al. | |
| 6,490,601 B1 | 12/2002 | Markus et al. | |
| 6,535,726 B1 | 3/2003 | Johnson | |
| 6,650,887 B2 | 11/2003 | McGregor et al. | |
| 6,832,084 B1 | 12/2004 | Deo et al. | |
| 7,133,846 B1 * | 11/2006 | Ginter et al. | 705/54 |
| 2002/0025795 A1 | 2/2002 | Sharon et al. | |
| 2002/0144275 A1 | 10/2002 | Kay et al. | |
| 2003/0001006 A1 * | 1/2003 | Lee | 235/381 |
| 2003/0040962 A1 | 2/2003 | Lewis | |
| 2003/0050962 A1 | 3/2003 | Monson et al. | |
| 2003/0097299 A1 | 5/2003 | O'Kane et al. | |
| 2004/0102190 A1 | 5/2004 | Forsberg et al. | |
| 2004/0148333 A1 * | 7/2004 | Manion et al. | 709/201 |
| 2004/0167837 A1 | 8/2004 | Reel et al. | |
| 2004/0172263 A1 | 9/2004 | Prieto-Moreno Torres et al. | |
| 2004/0176134 A1 | 9/2004 | Goldthwaite et al. | |
| 2004/0203583 A1 | 10/2004 | Kwan | |
| 2004/0215564 A1 | 10/2004 | Lawlor et al. | |
| 2004/0235413 A1 | 11/2004 | Min et al. | |
| 2004/0267646 A1 | 12/2004 | Chandhok | |

OTHER PUBLICATIONS

Liberty Alliance: http://www.projectliberty.org/faqs/main.html, visited Sep. 26, 2002.
Wave: http://www.wave.com/about/faq.html, visited Oct. 8, 2002.
DCX: http://www.daleen.com/products/digitalcontent/#DCX, visited Oct. 8, 2002.
MaxRate: http://www.maxbill.com/billing.html, visited Oct. 8, 2002.
Amdocs: http://www.amdocs.com/product_tree.asp?ID=30#36, visited Oct. 8, 2002.
mSafe: http://www.msafe.com/products.asp, visited Feb. 24, 2003.
InterTrust Technologies: http://www.intertrust.com/main/ip/litigation.html, visited Feb. 25, 2003.
InterTrust Technologies: http://www.intertrust.com/main/ip/index.html, visited Feb. 25, 2003.
Texas Instruments: mSafe Texas instruments Demonstrate Innovative 'Handset-Based' Method for e-Billing Applications on 2.5G and 3G Mobile Devices.
Webb, "Music for Rent," www.washingtonpost.com/wp-dyn/articles/A62329-2004May3.html, printed May 3, 2004.
E-C Logix: http://www.mail-archive.com/cryptography@wasabisystems.com/msg03011.html, visited Jan. 20, 2003.
ViaTech Technologies, Inc.: http://www.elicense.com/what/music.asp, visited Oct. 8, 2002.
Rosenblatt, "The Digital Object Identifier: Solving the Dilemma of Copyright Protection Online," *J. Electronic Publishing*, University of Michigan Press, Dec. 1997, 3:2, http://www.press.umich.edu/jep/03-02/doi.html, visited Jun. 10, 2004.
Stefik, "Letting Loose the Light: Igniting Commerce in Electronic Publication," Forum on Technology-Based Intellectual Property Management—Proceedings Interactive Multimedia Associate/U.S. Copyright Office, Jun. 1996.
Office Action in Related U.S. Appl. No. 10/874,712 (Sep. 6, 2007).
Office Action dated Nov. 1, 2007 for U.S. Appl. No. 10/392,496.
Office Action dated Jan. 10, 2008 for U.S. Appl. No. 10/862,482.
Antipolis, Sophia, Towards a User-Friendly DRM, W3C Workshop on Digital Rights Management, Jan. 22, 2001 to Jan. 23, 2001, pierre.vannel@gemplus.com.
Office Action for U.S. Appl. No. 10/874,712 dated Apr. 1, 2008.
Office Action dated Apr. 24, 2008 for U.S. Appl. No. 10/862,482.
www.ianywhere.com/whitepapers/mbus_anywhere_tech_ov.html.
Office Action dated Oct. 28, 2008 for U.S. Appl. No. 10/392,496.

\* cited by examiner

SYSTEM AND METHOD FOR SECURING DIGITAL CONTENT

CROSS REFERENCE TO RELATED APPLICATIONS

This is a continuation-in-part patent application, which claims priority from the non-provisional application with the following serial number and filing date: Ser. No. 10/392,496 (Mar. 20, 2003) which further claims priority from three provisional applications with the following serial numbers and filing dates: 60/367,964 (Mar. 27, 2002); 60/375,455 (Apr. 25, 2002); and 60/414,122 (Sep. 27, 2002). Each of those applications is hereby incorporated by reference into the current non-provisional patent application.

BACKGROUND OF THE INVENTION

1. Field of the Invention

The present invention relates generally to protecting digital information from mass, free distribution while allowing an authorized user to utilize said information on a variety of devices.

2. Description of the Related Art

Digital Rights Management

The term "Digital Rights Management" (DRM) has been used since the late 1990s by vendors and industry analysts. The term encompasses the management of legal rights, rightsholders, licenses, sales, agents, royalties and their associated terms and conditions. Copyright law gives the owner of copyright the exclusive right to do and to authorize (1) the reproduction of the copyrighted work; (2) the preparation of derivative works based upon the copyrighted work; (3) the distribution of copies of the copyrighted work to the public by sale or other transfer of ownership or by rental, lease, or lending; (4) the public performance of the copyrighted work; and (5) the public display of the copyrighted work. DRM is all about controlling those rights in consideration for the owner of those rights.

Prior to the widespread popularity of the Internet, content was physically distributed and therefore carried a set of implicit rights. Consumers could purchase an album from the record store. Album rights owners obtained consideration for this in the form of the consumer's money. The initial consumer could then sell his copy of the album to another person, but having done so he lost his right to listen to the album.

Digital copies of the content combined with peer-to-peer network services, however, such as the famed Napster, have removed almost all of the distribution constraints associated with the traditional model.

This section provides some background terminology used in the remainder of the document. These terms were defined long before the advent of the digital age, but their definitions remain constant.

Rights: The privilege, to which one is justly entitled, to perform some action involving the intellectual property of some entity.

Owner: The legal entity that owns the rights in some intellectual property by virtue of a copyright, trademark, patent and so on. These rightsholders may enter into legal arrangements whereby they either sell or license those rights or subset of rights to another party. When the rightsholder sells the rights they act as a seller or grantor of rights. When the rightsholder licenses those rights they act as a licensor.

Licensee: The legal entity that has either licensed or purchased rights for some type of content. If the user is licensing the rights, they act as a licensee.

Rights Transaction: The act of legally transferring rights from one entity to another. These rights transactions can be as simple as purchasing a DVD movie (right to view unlimited times), or complex business-to-business (B2B) transactions where many types of rights with complex provision are exchanged.

Rights models require more information than just the type of rights that have been granted to a user for a particular instance of content. For each right granted, there are additional rights attributes associated that express limitations, qualifications and/or compensation for the use of those rights.

Consideration defines the necessary compensation required in return for utilizing the associated right. Typically the consideration is monetary, but could also take any other form relevant to the content owner. The content owner may require that the user enter its demographics into their web site for example.

The extent of the right defines information such as how many times, for how long, during what periods or in what locations the right is valid. For example, a user might have purchased the right to play a video five times, or all weekend, or is only permitted to view a sampling of the video. In another example, a user of an e-book article might have the right to view the content unlimited times, but can only print the content twice. Due to export restrictions, some content rights might only apply in certain states or countries.

The last major attribute category is the type of user attribute, which provides the ability to group rights into different categories and provide those sets of rights to different users based on their user type. A user authenticated as a valid agent might have a license to copy a movie, while another user may only have the right to store the movie on a particular device and view the movie on that device.

Applications in a Digital World

The burgeoning Internet is entering a transitional phase between the early years of a wild-west free-for-all mentality to more secure, orderly, high speed and ubiquitous tool for everyone. In addition to this movement, the advent of Wireless Local Area Networks (WLAN) is extending the reach of the Internet beyond the tethered personal computers into the consumer's workspace and home environments. As many more consumer devices are being sold with standard WLAN and Bluetooth functionality, these devices are capable of collaboration in a Personal Area Network (PAN) that exists in the proximity of the device and may intermittently be connected to the Internet.

However, the Internet has not yet migrated over to a secure digital highway. The resulting networks of interconnected and intermittently connected devices have become a breeding ground for digital copyright infringement that extends throughout the entire worldwide network of devices. Over the past few years, a number of attempts have been made to provide some type of governance of the digital content that courses through the Internet and within the consumer's environments. The governance of these digital works is the crux of the Digital Rights Management (DRM) movement being pushed by the large copyright holders such as Sony and Disney. These rightsholders have seen the likes of the peer-to-peer network Napster single-handedly affecting their corporate bottom lines by reducing their sales revenues. Without a DRM solution in place, consumers can easily search the Internet for music, movies and publications that can be downloaded to a plethora of devices without paying compensation to the rightsholders.

The concept of rights to content was first introduced in the paper "Letting Loose the Light", which appeared in the 1996 book: "Archetypes, Myths, and Metaphors", by Dr. Mark Stefik of Xerox PARC research labs.

The problem with the early DRM systems is that they focused on preventing the consumer from duplicating the digital content from its original distribution medium. These mechanisms were eventually circumvented. The current generation of DRM solutions offered by IBM, Microsoft, InterTrust, RealNetworks and many others continue to alienate the consumers by imposing complex rights management processes and inflexible rules for the management and distribution of rights within the consumer's network of devices.

Paid Downloads

The paid download model was the original DRM business model. Customers could enter a provider's website, shop for content, enter their credit card and after validation download their requested content. This interaction model is similar to the business model where the consumer enters a store and immediately pays for some item. DRM systems can enforce the rights purchased by the consumer once the content is resident on the consumer's device.

Even though this business model closely aligns with the consumer's typical business model in the physical world, the paid download model has not fared well in the open market. Three limitations have hampered this model. Often, purchasing the content has been too complex for consumers. The DRM technologies have added to the complexity of the model. Finally, many consumers do not want to be tethered to their PC while viewing or playing content.

Subscriptions

The subscription business model is starting to make its way into the DRM world. An example of a music service offering a subscription service is PressPlay. In the subscription model, the consumer creates an account on the provider's website and typically picks a specific price plan. The plans offered by the provider allow the consumer to acquire a given set of rights on a monthly basis for content offered through the provider's website. The DRM system on the client enforces the rights allowed by the subscription the consumer has purchased.

Pay-per-Access

The pay-per-access business model has two forms: pay-per-view and pay-per-listen. Most consumers are familiar with the pay-per-view model as it has been around for many years. The pay-per-view model has been used for one-time events on television, such as boxing events and concerts. The model is also used in the cable and motel industry to offer movies on-demand. This model has existed even longer as a pay-per-listen model for the music industry. One of the oldest DRM technologies is the jukebox. Encased in a tamper-resistant device, the rights to play content one time was offered for the consideration of a nickel. Once the song ended, the right was revoked. The model has remained the same, but the technology has improved along with the complexity.

Usage Metering

The usage-based metering business model has been around for decades. As a result, consumers are very familiar with the model. The telecommunications industry has used the usage model for many years. However, the trend has been a reduction in the usage model in favor of a flat fee model. Consumers are starting to favor the flat subscription model over the usage-based model because they know what their costs will be at the end of the month.

The DRM methodology and the usage-based business model are well suited for each other. DRM technology provides the mechanism to capture the usage information as rights are invoked on the consumer devices. However, this raises some privacy concerns as consumers may not want to have their each and every content interaction, effectively watched. There are many programs today that include 'spyware' performing the same task by monitoring the user's activities. Consumers have responded by running software to remove the spyware from their devices.

However, consumer usage data is precisely the marketing information that Content Providers (430) covet. The ability for these providers to dissect their markets and tune their pricing structure would be extremely beneficial to those providers.

DRM Standards

There are many competing 'standards' in the evolving landscape of DRM technology. In this section, only two of those are presented as a sampling. The invention itself does not depend on one particular standard or another. These two standards are presented because they address two areas in which the invention may extract information to drive its processing. These standards are representative of the set of their respective standards in that each standard provides the type of functionality required by the invention.

All DRM systems must have the capability to uniquely identify a piece of content. One promising standard in this area is the Digital Object Identifier (DOI). The DOI standard stems from the Association of American Publishers (AAP) work on their online copyright management initiative. Bill Rosenblatt published the 1997 paper, "*The Digital Object Identifier: Solving the Dilemma of Copyright Protection Online*" which outlines the governing precepts for DOI. Any standard which substantially fulfills these requirements would also work.

The second important standards area relevant to the invention governs the rights document structure. One of the most complete standards for expressing rights within an XML document is the Extensible Rights Markup Language (XrML) standard. The XrML standard has its roots in the Xerox PARC research labs. Dr. Mark Stefik's work at Xerox focused on the concept of 'trusted systems', which can render content according to a precise definition. That definition turned out to be the Digital Property Rights Language (DPRL).

Cryptography

The main objective of incorporating cryptography in a DRM solution is to prevent the content from being accessed outside the control of the DRM solution. By forcing the access of content through the DRM solution, the rights, extents and conditions will be honored.

Symmetric Key Cryptography

When the key value used to encrypt and decrypt the data is the same value, a symmetric key algorithm is being used. The key in this case is termed the 'shared secret'. Any person or system having access to the shared secret can decrypt and re-encrypt the data. DES, Triple DES, RC4, RC5 and RC6 are common symmetric algorithms.

Asymmetric Key Cryptography

In the asymmetric encryption model, two different keys are used to perform the encryption process. One key, termed the 'public key' is provided to the recipient for use in decrypting messages sent from the source system as well as encrypting messages that can only be decrypted by the source system. The second key, termed the 'private key' is securely retained by the source system and is never revealed. The private key is used to encrypt the messages for systems possessing the public key and for decrypting messages sent from targets using the public key. These keys are also referred to as a key pair and are generated at the same time by the source system.

Message Digests

Another aspect to digital security is the aspect of tampering with data. An algorithm that uses a secret key can be used to create a one-way hash value that represents the exact value of the data. In order to recreate the same one-way hash value, the same data value must be provided again. Message digests don't prevent data from being tampered with, they only alert systems that the data has been altered in some way.

Digital Signatures

A digital signature combines the functionality of the asymmetric cryptography and message digests to mimic the real world handwritten signing of a document. The legal entity performing the signing function must have generated an asymmetric key pair and an associated certificate. The certificate containing the signer's public key is distributed to other entities that will need to verify the digital signature of the signer.

Smart Cards

Smart cards are often referred to as chip cards, or integrated circuit cards. The integrated circuit incorporated in either a plastic substrate or cellular phone SIM card contains elements necessary for data transmission, storage and processing. Typically the smart cards do not contain their own power supply, display mechanism, input device or system clock. Smart cards can be either simple memory cards or microprocessor cards. They can further be classified based on the access type: contact cards and contactless cards. The memory cards are used to store information and don't provide any processing power on the card itself. The microprocessor cards however, provide the ability to load software onto the card where it can securely execute within its own processor. The microprocessor cards are type suitable for the invention presented in this document.

Code Obfuscation

A common technique used today to secure software is obfuscating the code instructions. As opposed to the smart card scenario, code obfuscation attempts to prevent attacks against the software that executes in standard operating environments easily accessible to the attacker. A typical software attack is to reverse engineer the distributed software into a form that can be modified and then substituted by the attacker.

Trusted Computing Platforms

The computing industry has awakened to the need of a distributed computing environment where software providers can be assured that their software will not be altered, examined or spoofed by other software and hardware components. Industry consortiums, such as the Trusted Computing Platform Alliance (TCPA), and individual hardware manufactures, such as IBM and Texas Instruments, are currently delivering specifications, chips and peripherals that support this type of trusted environment.

The trust in a platform is measured by integrity metrics of that platform. The metrics consist of data expressing the integrity of the system component that can be reliably measured and reported. Software can then query the client component first to determine if it satisfies the required security metrics before trusting the client component. The trusted platform specification provides a complete set of secure cryptographic functions, including the storage of keys and data.

DRM Shortcomings

Initially the DRM industry has focused primarily on blocking the ability of consumers to duplicate and redistribute their digital content. Another more recent set of the industry has focused on the creation of a centralized model for DRM. A centralized license server (120) creates an encrypted license that authorizes a single user to access content. The license is typically tied to a specific device. These centralized models have proven to be very inflexible from the end consumer's point of view. For example, many of these centralized systems require a tethered approach where the device is constantly connected to the Internet. Additionally, it is difficult, if not impossible, to get the license to work on another device owned by the same consumer.

Another breed of DRM systems aims to separate content from license rights. Among these DRM systems is U.S. Pat. No. 6,385,596, issued May 7, 2002, to Wiser (the Wiser Patent) for a "Secure Online Music Distribution System". This system enhances security through the use of a personal, digital passport in each media player. The digital passport contains identifying information that identifies the purchaser, along with confidential information, such as a credit card number, along with the encryption keys. The media player displays the confidential information during playback of the decrypted material. In order to pass the encryption keys to another party, the original party's confidential information would necessarily be exposed to them as well. The superdistribution model is a powerful business model, but, to be completely effective, it requires additional abilities to manage the process and insure the proper settlement of royalties for each rights transaction.

The physical distribution of content and the associated rights have two fundamental models. In one case, the rights and content are conjoined entities and cannot be separated. As conjoined entities, these distributions are packaged for each individual device that purchases the content. The distributed file is valid only on the target device for which the content was packaged. The second fundamental model of distribution separates the rights and content into their respective parts. The rights are packaged into a file termed the license document. There are variations in this model as to when the license document (370) is acquired and if the content file is encrypted for the specific device. The salient point is that distribution of the content and the license document (370) can be two different actions.

SUMMARY OF THE INVENTION

The invention addresses the primary limitations of the "Wiser" patent. The invention has the capability to streamline the purchasing process by handling micropayments on the device. The invention simplifies the consumer's DRM experience and enables a secure, legal distribution of the user's rights to content among their own and other's personal devices.

Embodiments of the invention do not require devices to be registered at a centralized site. Various embodiments may have a wireless hookup to a backend processing system or store balances therein.

For instance, embodiments could offer discounts across the consumer's devices for those users that want to participate in marketing analyses. It may establish a domain of valid devices that may participate in cross-device discounting. Using embodiments of the invention, creative pricing models may be implemented based on usage, across devices and more.

Various models also support the ability for end consumers to transfer the rights from one account to another. The encrypted content may still exist on the original consumers device, however the rights are no longer present as they may be transferred to another device. Digital rights are neither created nor destroyed during this process, but are merely transferred as in the physical entity model.

Various embodiments may include an embedded balance management system that debits the consumer's device account balance as content is consumed on the devices. Devices with internet access may also replenish account balances by purchasing additional access rights from either the Content Provider, a License Server, or other authorized entity. An account balance/rating algorithm may be stored on the device along with the rights within the license document. In this case, any balance/rating algorithm associated with the rights may be transferred along with the rights document if the key is transferred to another account. Therefore, any balance associated with the rights is consumed even when the rights are transferred, as the state of the rights can be part of the license.

Embodiments of the invention may be embedded into each device a consumer wishes to use. DRM systems do not have to be homogenous, however, some conversion may be necessary to transport a rights file into a different system. For security purposes, heterogenous DRM systems may be programmed to perform a handshake with each other prior to transferring any files over. A minimum threshold of security may be set by the system providing the files before said system will conduct such transport.

The rights associated with content in a superdistribution model must specify what a consumer can do with the content after they have bought those rights. This set of rights specifies those rights that may be passed along to the next user along with any limitations and considerations associated with the rights transaction. In a true superdistribution model, each user becomes a potential reseller for the rightsholder as they can independently carry out rights transactions that result in revenue for the rightsholder.

Assume a superdistribution model where content is encrypted and sold to user A with the render rights to play as well as superdistribution rights to permit the rendering of the content after a percentage of the original retail price has been sent to the publisher. User B would like to copy the content after meeting user A. User A transmits a copy of the encrypted content over to B's device. User B must still acquire a valid rights document to access the encrypted content. A's rights provide the ability to resell the rights as long as the rightsholder receives X % of the original retail price. The fee charged to user B by user A can be split between user A and the rightsholder. Once settled, A's device can transmit the rights document over to B's device enabling the render right as well the continued superdistribution right. In a true superdistribution model, user B could also act as another agent of the rightsholder just as user A performed in this rights transaction.

This embodiment would require some network connectivity to perform settlement of new licenses.

In another embodiment, there may be a computer-implemented system for accessing digital content, the system comprising a media device which comprises a digital rights management system. Computer-implemented systems may run the gamut from hardware, software, firmware implementations that may or may not be networked/distributed or embodied on a single entity. At least part of the system may reside within a media device which may include virtually anything capable of being wired to perform the operations described herein. Initially, the invention will be most useful in the context of handheld devices (audio/video players, game stations, cameras, telephones, etc.) or PCs. Eventually, however, media devices may include household appliances (i.e., refrigerators), musical instruments (i.e., electronic keyboards), and more.

Development of digital rights management systems are known in the art, however, the application of this technology to the current invention represents a new stage in a) the protection of intellectual property rights; and b) facilitating the consumer's ease of access to such intellectual property. Digital rights management systems encompass any computerized technology which is used to enforce intellectual property rights whether such systems rely on passwords, encryption, biometrics, etc. including combinations thereof.

A user of a media device may use the media device and its embedded digital rights management system to download a digital content package from a source (a server; another user's device; etc). Next the digital rights management system may be encoded to execute instructions to create a license rights package to be associated with the downloaded digital content package. A license rights package represents the permissible uses a user may make of the downloaded digital content.

The user/consumer/customer may purchase (through a prepaid account, a credit card, debit card, etc.) the license rights package. The license rights package will include enough information regarding the means of purchase so that future purchases may be effected (i.e., for credit card—the number and the expiration date). The user then downloads the license rights package to their media device. Assuming that the rights contained in the license rights package are finite, the digital rights management system keeps track of when those rights expire. For instance, if the user has purchased a license to read a book five times, then the digital rights management system is configured to debit an access each time the user reads the book. If the rights are based on time, for instance a one-month rental of viewing rights, the digital rights management system tracks when the month has run its course and, afterwards, refuses access to the digital content package. The digital content package may be encrypted to prevent the user from otherwise accessing the digital content package without the necessary decryption keys in the license rights package.

Once the license rights package is exhausted, the digital rights management system may offer the user options to renew the license rights package by charging the account number contained in said license rights package.

Alternatively, if the user wishes to change the original license rights package or create a new license rights package upon the expiration of the first license rights package, the system may be configured to allow the user to modify the license rights package and apply a difference to said account number contained in said license rights package. A credit may occur if the user restricts some of the privileges provided on an active license rights package.

The digital rights management system also allows one to "loan" their licensed digital content to another person by transferring both the license rights package and the digital content package to another media device. This may be utilized by the initial user as well to obtain access to their digital content on a variety of media. The second user would also need to have a digital rights management system capable of tracking usage under the license and the appurtenant charges thereof. This is particularly effective at protecting intellectual property (even more so than the Wiser patent) because while a user may trust a friend enough to be willing to let them see their credit card number, it is unlikely that they will be willing to pay for their friend's usage unless that is what they truly intend. If the transferred license has expired, the digital rights management system will charge the original account number embedded therein for any renewal or extension. Also, under this system, protected (perhaps encrypted) digital content packages may be transferred freely among persons. A second user may easily obtain their own license using their own account numbers as their digital rights management system should prompt them to do such when they attempt to access digital content for which they do not have a license.

The second user may renew or extend the rights contained in the transferred license rights package. If they have received a transferred license, the digital rights system may charge the original account embedded therein or provide an option to the later user to enter a new account number.

When a user downloads a license rights package onto the media device, the license rights package may be stored in a license storage area on the media device so that the digital rights management system may scan any license rights packages stored therein to determine if the user has rights pertaining to a particular digital rights content package or if the desired rights are present. License rights may comprise any number of potential ways of accessing and may be flexibly grouped or packaged as desired by the consumer. These may be structured around the ability to use, read, write, print, view, hear, display, etc. They may be structured according to any paradigm desired including per use; time-based, recurring, subscription based, consumption based, etc.

The digital rights management system is configured so that a license right package for the desired access must be present on the media device or the system will not permit access to the digital content package. As said earlier, the digital content package may be encrypted or protected in some other manner so that this file, alone, would be inaccessible to the potential user.

In another embodiment, the digital rights management system will prompt the consumer to procure a license rights package if said license rights package does not exist in said license storage.

In another embodiment, the consumer may set a limit (or a default limit may be encoded in the license rights package) or threshold at which point the digital rights management system will alert the user that their license rights package is near expiration or, perhaps, has expired. Such prompting may also occur if the user attempts to access the digital content package in a manner not permitted by the current license rights package.

In another embodiment (which may be applied to any of the foregoing embodiments singly or in combination), the system may include a rating engine to facilitate stand-alone operation of procuring license rights for additional access to the digital content package. In the license rights package downloaded to the user's media device, there may be included metadata (data and algorithms) governing access to a particular piece of digital content. The rating engine may access this metadata to calculate the cost of additional license rights. The rating engine may simultaneously connect to a host system but the key here is that it does not have to do so. Once the user selects the additional license rights, the rating engine may calculate a price thereof and store a charge (using the account number embedded in the license rights package) for later transmittal to the host system. If the user has a pre-paid account, the rating engine may simply debit the balance of the pre-paid account (stored within the media device) and have no need to contact a host processor. This feature is particularly useful for when there is no communication access to a host processor or ASP (application service provider). For example, a family is driving cross-country and is not near any communication towers. Junior is playing a game on his system and runs out of permitted accesses. This system allows a user to obtain additional license rights without the contemporaneous need for connection to a back-end system.

When a license rights package is renewed or modified, the system may either create a new license package or simply alter the pre-existing license rights package.

In another embodiment a computer-implemented system for accessing digital content may comprise a media device further comprising a digital rights management system and a rating engine; a content server; and a license server. The content server and license server aspects of the system may exist in separate machines or within the same machine but remotely located from the media device. A content server component is mainly responsible for storing content. A license server component is mainly responsible for maintaining the building blocks for creating licenses. The rating engine, on the media device, utilizes both to create packages to enable a user to access digital content.

The content server may be configured to store and index digital content. The license server may be configured to store a plurality of data and algorithms to be associated with a particular set of digital content (digital content package). The media device may be configured to access the content server to search said content server for a particular digital content package; download the digital content package to said media device wherein said digital content package is further configured with an identifier. The media device may also be configured to access said license server; access a set of data and algorithms associated with said selected digital content package via said identifier; create a license rights package for said downloaded digital rights; charge said license rights package to an account associated with a consumer procuring said license rights package; incorporate said account number in said license package for future charges; and download said license rights package to said media device. The digital rights management system, contained in the media device (alternate embodiments may also envision embodying the digital rights management system in a plug-in or accessory component to the media device) may confirm that a license rights package exists when said consumer attempts to access said digital content package on said media device. If a desired access is included on said license rights package; said digital rights management system debits said license package for said desired access and permits said access. Otherwise, the digital rights management system prompts said consumer to renew or extend said license rights package by charging a renewal or extension to said account number associated with the inadequate license rights package.

BRIEF DESCRIPTION OF THE DRAWINGS

The accompanying drawings incorporated in and forming part of the specification illustrate several aspects of the present invention.

FIG. 9 is a UML diagram illustrating the refreshment of a loaned license.

For the purpose of promoting an understanding of the principles of the invention, reference will now be made in detail to the present preferred embodiment to the invention, examples of which are illustrated in the accompanying drawings and specific language will be used to describe the same. It will nevertheless be understood that no limitation of the scope of the invention is thereby intended toward such alterations and further modifications in the illustrated device and such further applications of the principles of the invention as illustrated therein as would normally occur to one skilled in the art to which the invention relates.

DETAILED DESCRIPTION OF SEVERAL EMBODIMENTS OF THE INVENTION

The DRM industry relies on the fundamental concept of Rights. The DRM industry has a set of typical business models that exist between consumers and rightsholders. The invention does not specifically depend on these standards, but a preferred embodiment may be built using these standards or others supplying the same type of functionality.

Figure 1:
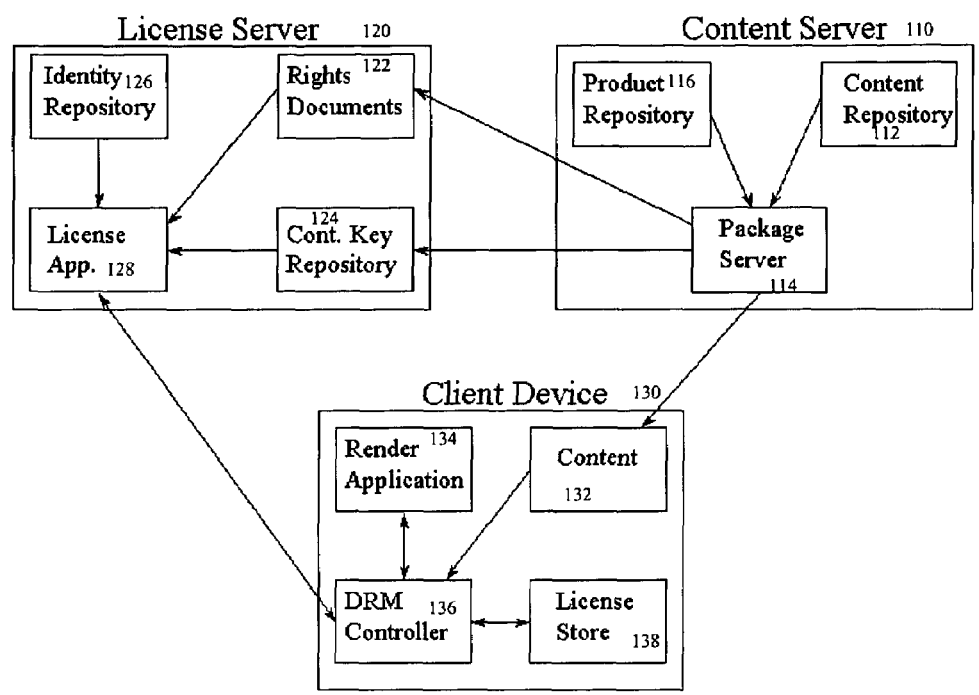
FIG. 1 displays three components of an embodiment of the invention: License Server, Content Server and Client Device.

Referring to FIG. 1, the reference architecture discussed in this application supports the separate distribution of the rights document necessary for the implementation of the superdistribution business model. The reference architecture/platform comprises three major components: the content server (110), the license server (120) and the client (130). Each of these components collaborates with the others to complete the DRM implementation. It should be noted that in some embodiments, the content server (110) and the license server (120) may comprise one entity. In other embodiments, these components are separated to provide better distribution of the workload.

Content Server (110)

Digital Rights Management systems center around the content (132). The content server (110) may make digital content (132) available for download to devices participating in the DRM arrangement. The content (132) should be packaged in a suitable format to interact with the DRM system (100). Typically, the content may be encrypted and the file may be tagged with some globally unique identifier that can be used to later resolve the identity of the digital file.

The content server (110) may catalog the available content (132) in a content repository (112) and provide some type of registry (212) that allows potential consumers to navigate list of available content for download. The registry may contain descriptions of the content as well as marketing information.

A product repository (116) may comprise a set of metadata about each content item being offered by the content provider. The metadata may include a variety of information meaningful to the content provider as well as information that describes the content such as title, author, price, content media type, etc.

The content server (110) may collaborate with both the client (130) and license server (120) components. The client may access the content server (110) to obtain the content (132) in the first place. Even when the superdistribution model is supported, the content (132) may be initially distributed to seed the model. The content server (110) may also collaborate with the license server (120) to convey the encryption information used in the packaging process (114) to ready the content (132) for distribution.

License Server (120)

The license server's (120) primary responsibility is to package the appropriate rights document (122) with the appropriate decryption key for the requested content (132), and provide that packaged license to the client device (130). The license server (110) may also create a set of rights documents (122) that the rightsholder will grant to users of the content (132). These rights documents might also contain the compensation metadata associated with the various rights. In order to authenticate clients, the license server (120) also processes encryption keys and certificates presented by the client (130) via the Content Key Repository (124) and the Identity Repository (126). Once authenticated, the license server (120) can process the client's request. The device could, for example, prompt for a password or personal identification number that is passed to the license server (120).

The license server (120) may present the client with options associated with the rights being requested. For example, the license could be acquired in exchange for a fee or the client may opt for allowing their usage to be recorded for marketing purposes. Once the consideration arrangements have been completed, the license application (128) generates the appropriate license package for that particular rights transaction. This license package is then downloaded to the client device (130). The client may transparently acquire the license through the content server. In an alternative embodiment, the rights document (122) may be independently and directly obtained from the license server. In this embodiment, the content server delegates some of its traditional responsibility to the license server.

The license server (120) may also collaborate with the content server (110) to obtain updates about new and existing registered content. The content server (110) may update the rights documents (122) that are to be offered to clients, as well as change the encryption information for a piece of content.

Client Device (130)

The client device (130) may acquire content (132), authenticate the current device user, request licenses from the license server (120) and finally adhere to the policies of the rights document courtesy of the embedded DRM system. The client device (130) may also create a local repository (138) of existing licenses that have been acquired in the past. Once all of the DRM functionality has been taken care of, the client device (130) can also render the content (132).

All of the DRM functionality on the client device (130) may be performed by a DRM controller (136) that typically plugs into a rendering application (134) on the client device (130). When a rendering application (134) attempts to access DRM restricted content, the rendering application (134) delegates down to the DRM controller (136). The DRM controller (136) performs its authorization of the requested rights, and if successful decrypts the restricted content so that the rendering client may access the content.

Figure 3:
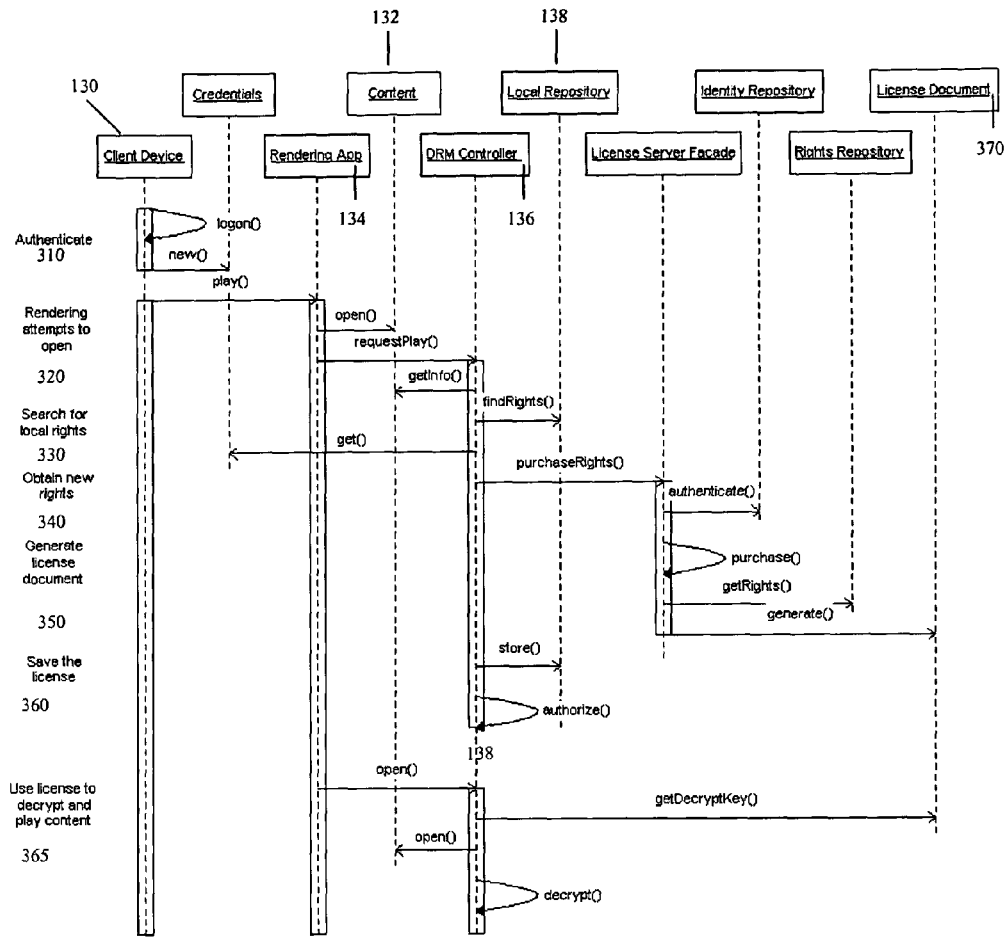
FIG. 3 is a UML diagram illustrating the interaction between the Client Device, License Server and Content Server to obtain a license.

Referring to FIG. 3, once the user has been authenticated on the device (310), the DRM controller (136) can access any existing licenses that have been stored (138) on the client device (130). When DRM restricted content is first accessed by the client application, the DRM control first examines this local repository (138) for a license document. If one is found, the local license is examined for the requested rights. If the rights have expired or the license document (370) was not found in the local repository (138), the DRM controller (136) can then collaborate with the license server (120) to acquire a new rights document.

Interaction Model

Figure 2:
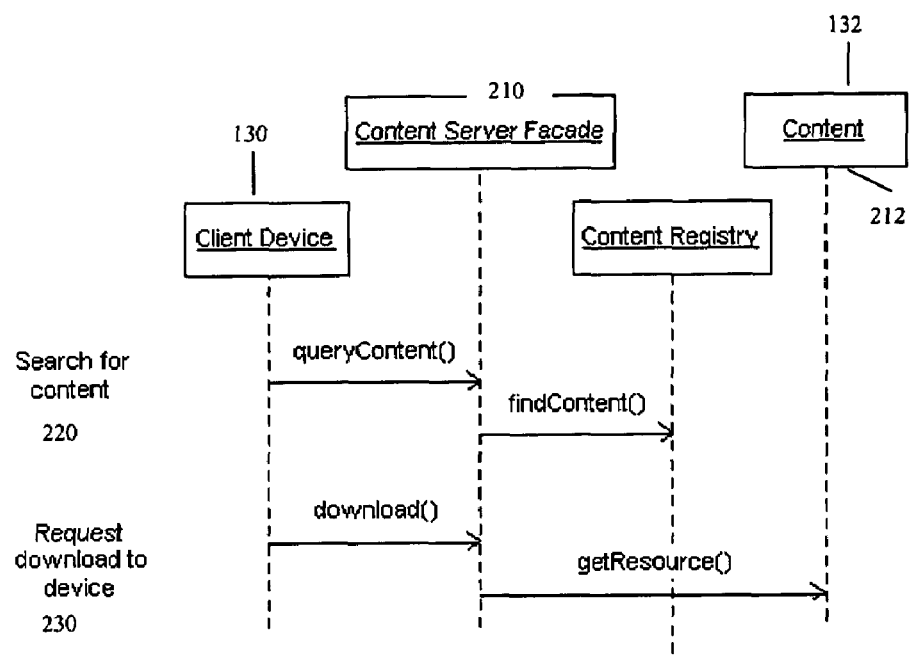
FIG. 2 is a UML diagram featuring a search and request operation between a Client Device and a Content Server.

Referring to FIG. 2, in the typical interaction between the three reference DRM components, the process starts by the client device (130) acquiring the content (132). In the superdistribution model, the content (132) can be acquired from many sources. In FIG. 2, however, the client is depicted searching the content server (110) for some content. In the peer-to-peer world, this could just as well be the popular Morpheus file sharing software or other equivalents thereof.

In this case, the client typically uses their favorite Internet browser to access the Content Provider (430)'s web site via the Content Server Facade (210). The Client Device (130) then issues some type of query for the type of content by genre, title, author, etc. The content server (110) searches its repository of content looking for likely matches. The results are returned to the client device (130). The user may choose one or more of the results for download. Once the items have been selected, the content server (110) can download the restricted content files down to the client device (130).

Another potential responsibility the content server (110) may have is to dynamically prepare the content for the client (130) on the fly. In this case, the content server (110) may have the ability to serve many types of clients (130) that may have different distribution requirements. A publisher client will have a different distribution channel than a client using the DRM system to view the content over the web. The content server (110) in this case is really a centralized file server distributing its content in the appropriate format and channel.

Once the client has obtained the DRM restricted content (132) on their client device (130), they will attempt to access the file (320) using some type of rendering application (134) as depicted in FIGS. 2 and 3. Again, the client user may be required to authenticate themselves (310) to the client device (130) in some fashion acceptable to the DRM controller (136).

For authentication (310), the Windows sign-on identity may serve, or the DRM controller (136) may require its own personal identification number, or even require some type of biometric authentication from the device. The key point is that the DRM controller (136) must have access to some type of credential that can be passed on to the license server (120).

The license server (120) interaction starts when the client user attempts to access (320) the DRM restricted content file typically using some type of rendering software (134). The rendering software (134) typically has a plug-in capability for the DRM controller (136) to assist in the content access. When the rendering software (134) accesses the file header information, it detects that the content file is DRM restricted and then delegates the access to the DRM controller (136) plug-in.

The DRM controller (136) examines the header information of the content file to obtain the unique identifier of the content. This ID is used to associate the appropriate license document. The DRM controller (136) first examines (330) its own local registry (138) of license documents (370) obtained from prior requests. If the local repository (138) has the appropriate license document (370) that matches the content unique identifier, that license document (370) is used to determine the user's granted content rights. However, if the local registry (138) doesn't contain the correct license document (370), the DRM controller (136) will attempt to connect (340) to the appropriate license server (120).

The DRM controller (136) at this point must obtain (340) a license for the content (132). The DRM controller (136) can perform this task in the background, or prompt the user along the way. For this example, assume the silent mode is being used. Before the DRM controller (136) contacts the license server (120), it must acquire the credentials of the user at some point. This information is passed to the license server (120) to authenticate the remote client to the license server (120). Once authenticated, based on the passed credentials, the license server (120) is ready to process the client request.

In the silent mode, the DRM controller (136) has requested some pre-configured type of rights for a certain amount of consideration, e.g., twenty plays for the consideration of $1.00 debit of my account. If the mode were not silent, the user would typically have options associated with various rights/considerations models. Based on the requested rights being purchased, the license server (120) selects the corresponding rights document from a repository of rights (116). The rights document (122) and the appropriate decryption key for the content (132) are packaged (350) into a license document (370) that can be securely transmitted down to the client device (130). The client device (130) may provide its public key as part of its credentials, which is used to encrypt the license key for secure transmission.

Once the license has been returned to the client DRM controller (136), it is stored (360) within the local repository (138) for future access. Now that a license document (370) has been acquired, the DRM controller (136) can attempt to validate the original rendering request. The rights document within the license document (370) is checked for the appropriate rights and extent or parameters surrounding those rights. If the DRM controller (136) successfully validates the access request, the content decryption key is extracted (365) from the license document (370) to decrypt the DRM restricted content file. The resulting content data can be streamed back to the rendering software (134) for final display. The DRM controller (136) may then update the license document (370) to reflect any new state associated with the permitted extents, such as the number plays remaining.

Separation of Rights from Data

Figure 4:
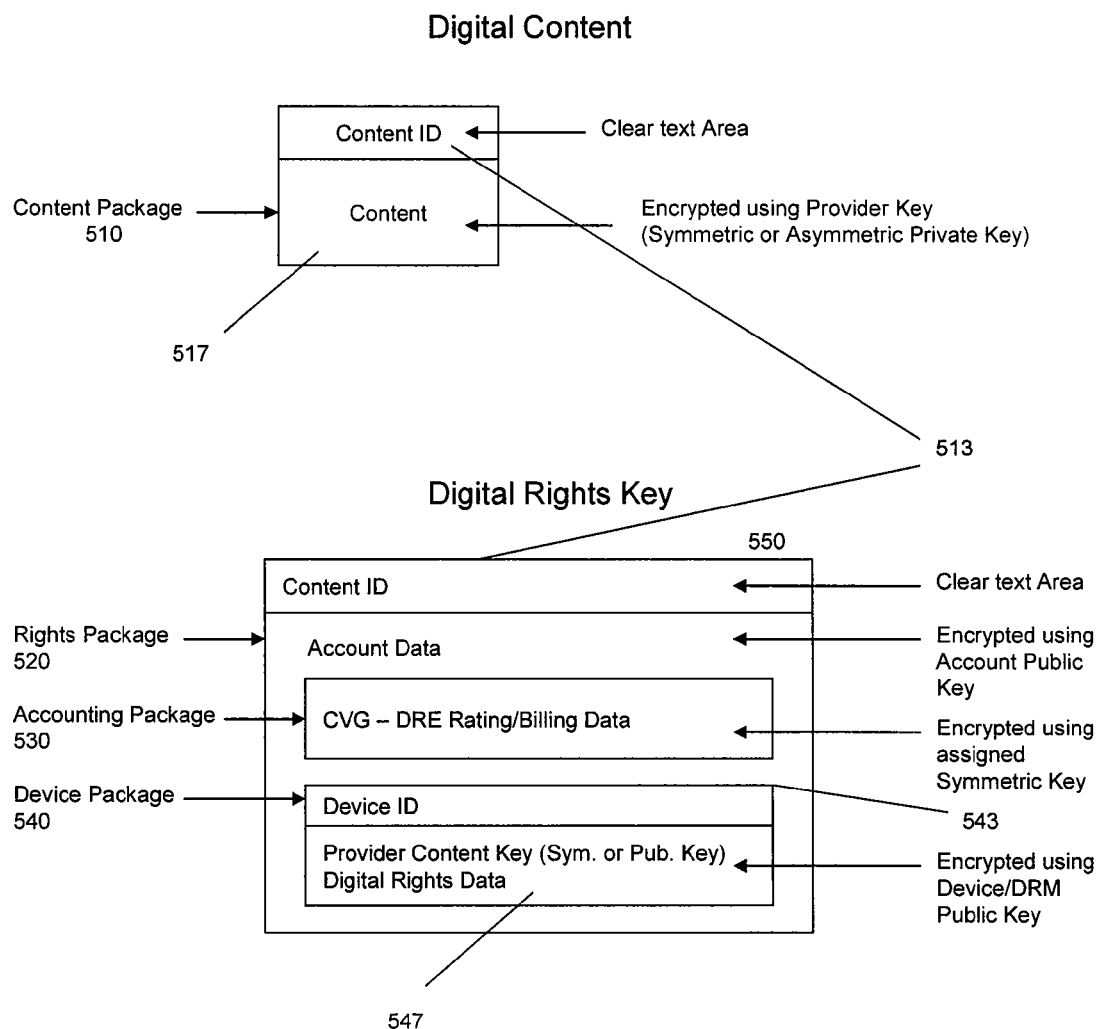
FIG. 4 illustrates the embodiment of a content file and a rights package.

Referring to FIG. 4, embodiments of the invention may utilize two primary structures. Referring to FIG. 4, the Content Package (510) comprises the encrypted content (517) and an associated unique identifier (513). The Digital Rights Key Package (550) comprises a number of entities and encryptions to protect and administer the associated digital content.

Content Package (510)

The digital content (517), utilizing potentially an independent delivery channel, may be matched with its associated digital rights key (550) by the use of a Content ID (513) stored in the header area of the distributed content. The value and structure associated with the Content ID (513) may be opaque to this design. The Content ID (513) may be assigned by the Content Provider and may be intended to have meaning to that entity. The value, within the realm of the design, may be solely used to associate the encrypted digital content file with the appropriate rights package The preferred embodiment of the Content ID (513) may be unique across all content providers and identifies the specific content within the provider's library. Further, it conveys an association to which key was used by the content provider to encrypt that specific instance of the digital content. Only the content provider knows this association.

In order to complicate the hacking and distribution of digital rights keys, the content provider may be free to distribute many copies of their content, encrypted with many different encryption keys to create a genetic diversity of content. As the content may be redistributed through peer-to-peer networks, these various copies of content are intermixed in the network making it more difficult to even find the right key to launch an attack against.

The Content ID (513) may or may not be encrypted in the header area of the Content Package (510). This enables the retrieval of the ID without requiring a well known encryption key. If the ID is altered in the content package, either the associated digital rights key will not be found or the incased provider content key (547) will not match the key required to decrypt the tampered digital content package.

Rights Package Structure

The Rights Package (520) may be an aggregation of information obtained from the user's account, the content provider and DBR information for the content. These keys are actually generated locally within a secure processing environment after purchasing the rights for the content. Each outer layer may encrypt each inner layer.

Content ID

As in the Content Package (510), the Content ID (513) may be an opaque identifier used to associate the digital rights key (550) with the appropriate digital content package (510). The content ID (513) may be stored in the clear for access without a well-known encryption key. Altering the content ID will not yield the correct Provider Content Key (547) and therefore, cannot be used to decrypt unassociated content.

The Content ID (513) may be composed of information necessary to locate the appropriate DRM license server performing the role of CRP where the corresponding decryption key can be purchased. In addition, the Content ID (513) expresses whether a relationship exists between either a single content entity, or a grouping of content entities. For example, a Content ID might denote that the key may be for a single Beatles song, a Beatles album or the entire Beatles anthology.

The innermost layer of information, contained in the Device Package (540), may be provided by the content provider. The device package (540) consists of a unique Device ID and an encrypted payload. This layer does not encrypt the device ID, however its outer layer (Rights Package) does encrypt the ID as part of the Device Package (540).

The Device Payload (547) may be encrypted by a public key provided by the device to which the content may be licensed. The device (130) retains the private key necessary to decrypt this layer. Each device provides an ID that associates its identity to the keys it provides. There can be one to many Device Packages (540) depending on the set of devices licensed by this single instance of the Digital Rights Key authorized to access the content.

The Accounting Package (530) contains information necessary to apply rating and billing algorithms against the instance of digital content. In the preferred embodiment, the payload may be passed to the Device Based Rating component (DBR) to perform the rating and billing functions. This payload may be considered to be stateful information and therefore, can be updated by the DRE during any rights authorization sequence of events.

The payload may be encrypted using a symmetrical key assigned to the account. No two accounts have the same symmetrical key for DRE encryption purposes. The symmetrical key serves as a shared secret so that an embedded DRE can decrypt the payload and re-encrypt the payload with updated stateful information.

The entire digital rights key may be referred to as the Rights Package (520). This package contains the Content ID (513) for association with the encrypted content and an encrypted payload. The payload encompasses the Account Information, Accounting Package and all Device Packages. The payload may be encrypted using the public key assigned to the account. Only devices associated with the same account have access to the required account private key to decrypt the Rights Package payload.

The Account Information contains the user's account information such as their name and credit card information originally used to purchase the rights for this content. The credit card information can be used to purchase additional rights based on user interactions and intent. The information also serves as an audit trail of the Digital Rights Key and as deterrent to posting Rights Keys on the Internet.

Setup of Certificates

The scenarios provided illustrate one example for the initial setup of the certificates used to process the keys, purchase and access content. A second set of scenarios discusses the potential loaning of a digital rights license from the account's device to another account's device. Further, the second device can renew the license by billing either the original owner's billing data or their own.

Figure 5:
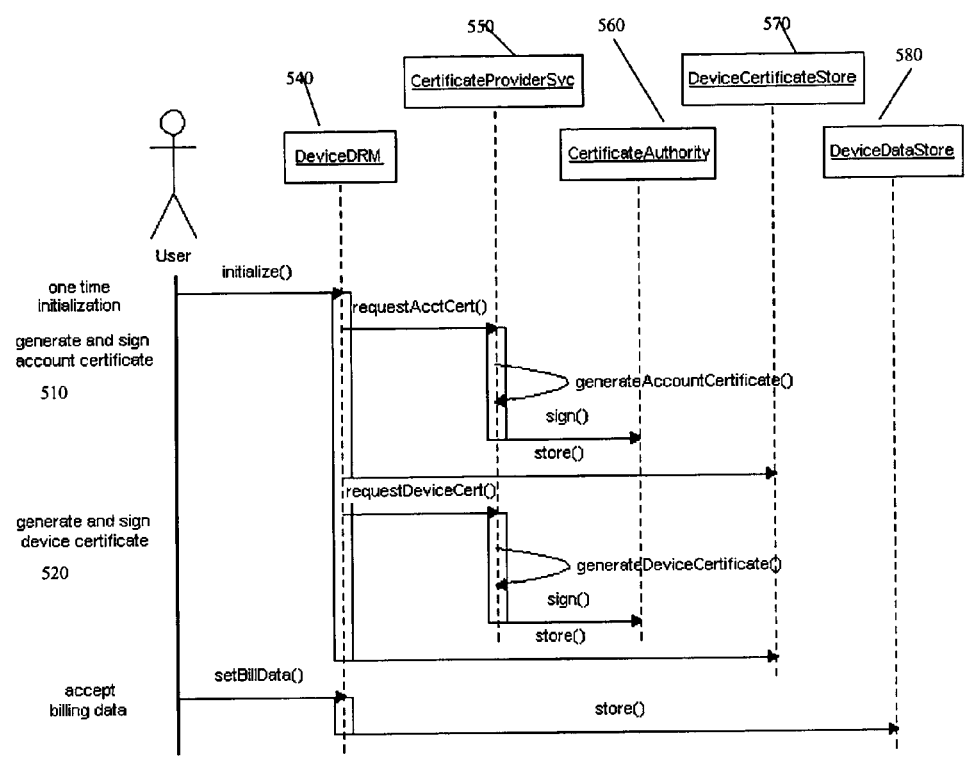
FIG. 5 is a UML diagram illustrating the creation of an account certificate and device certificate for encryption purposes.

Referring to FIG. 5, the process of initializing the device may occur once. The device may be configured with an Account Certificate (510) and a Device Certificate (500). The private keys associated with the certificates may be stored on the device (130) in a manner that they can be accessed in a secure fashion. The private keys never leave the device. The certificates themselves are generated by the Certificate Provider Service (550), which may reside off of the device in order to access the Certificate Authority (560) that signs the certificates. If the Certificate Provider Service (550) may be located off of the device (130), the certificate including the private key may be transmitted to the device securely using an SSL type connection.

The Certificate Provider Service (550) generates two certificates; one for the account and one for the device (130) itself. Once the certificates are generated, they are stored on the device (130) for subsequent processing.

In addition to the certificates, the device (130) can be configured with billing data, such as credit card information. The billing data may be used to purchase content for the account and will be subsequently stored as part the content licenses.

Figure 6:
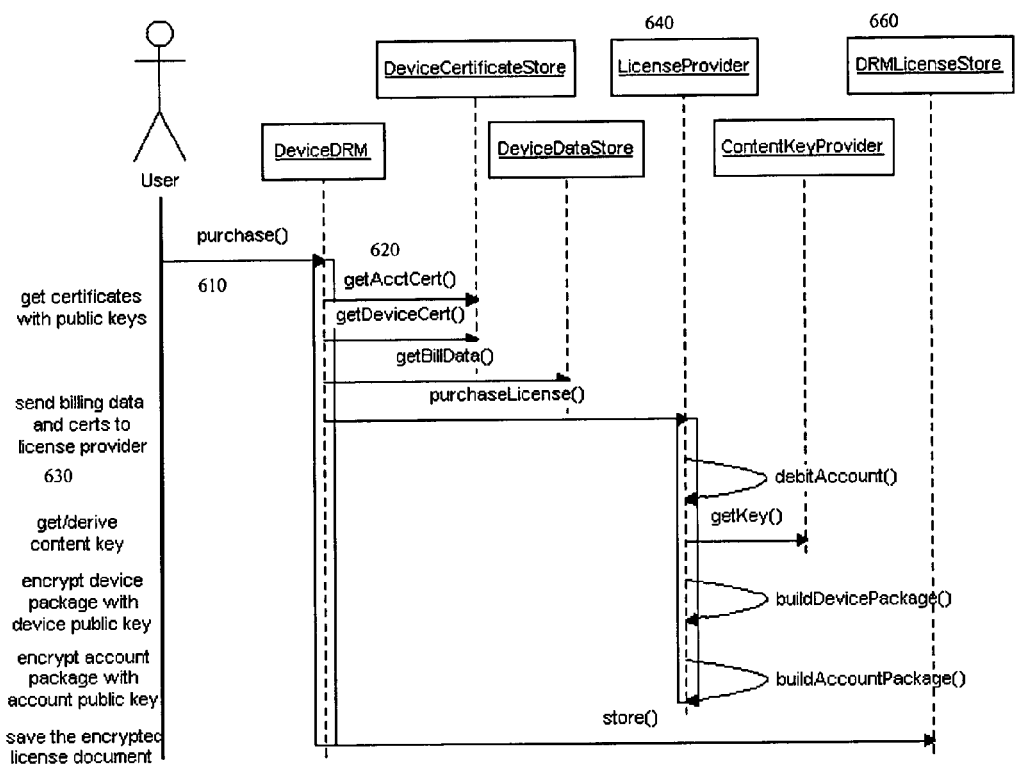
FIG. 6 is UML diagram illustrating the purchase of a license.

Referring to FIG. 6, when the user purchases content (610), the DRM system must first acquire the Account and Device certificates (620) that contain their public keys. The DRM system may either prompt the user for billing data, or use the configured billing data to pay for the content. The billing data and the certificates are transmitted (630) to the License Provider (640) along with the Content ID being purchased.

The License Provider (640) authenticates the certificates by checking the Certificate Authority that signed the certificates. The billing data may be used to charge the account associated with the data. If successful, the License Provider (640) can then build the appropriate key by first acquiring the content key associated with the content ID provided and a License Document that reflects the rights purchased. The License Provider (640) encrypts these artifacts with the Device Public key to create the Device Package. The Account Public key may then be used to encrypt the Device Package. The accounting data may be added along with the Content ID and then the entire License may be digitally signed by the License Provider (640). The result may be then returned to the device, where it may be stored in the device's DRM License Store (660).

Figure 7:
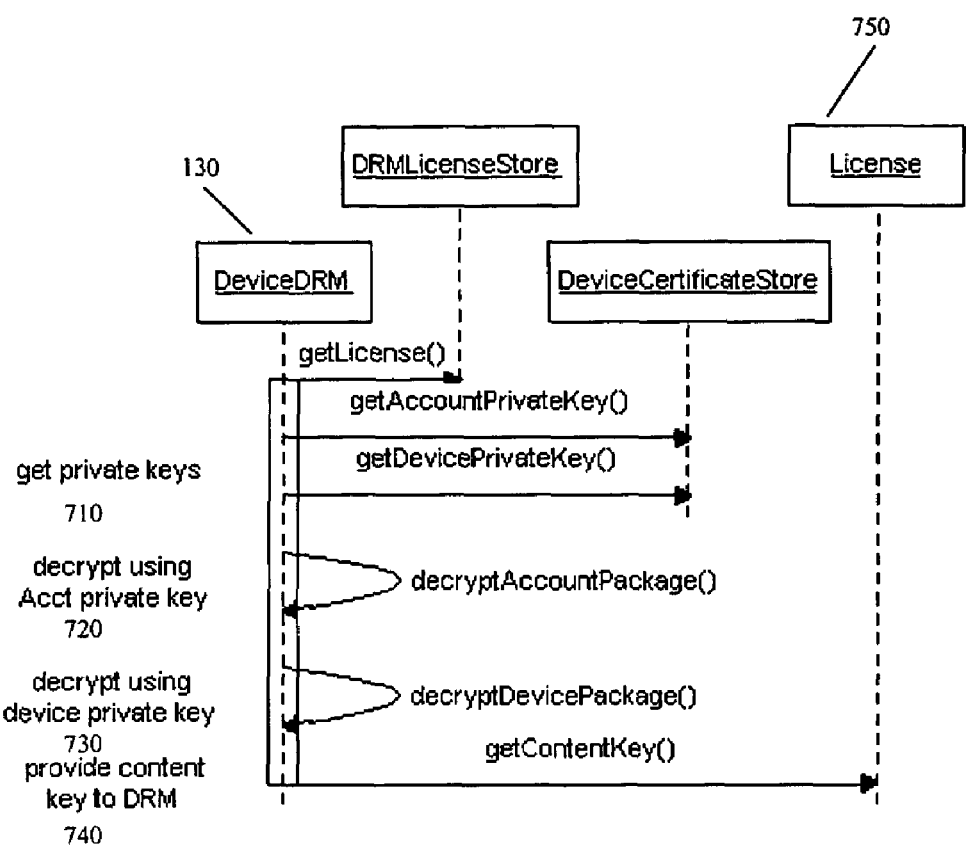
FIG. 7 is a UML diagram illustrating the access of content.
Figure 8:
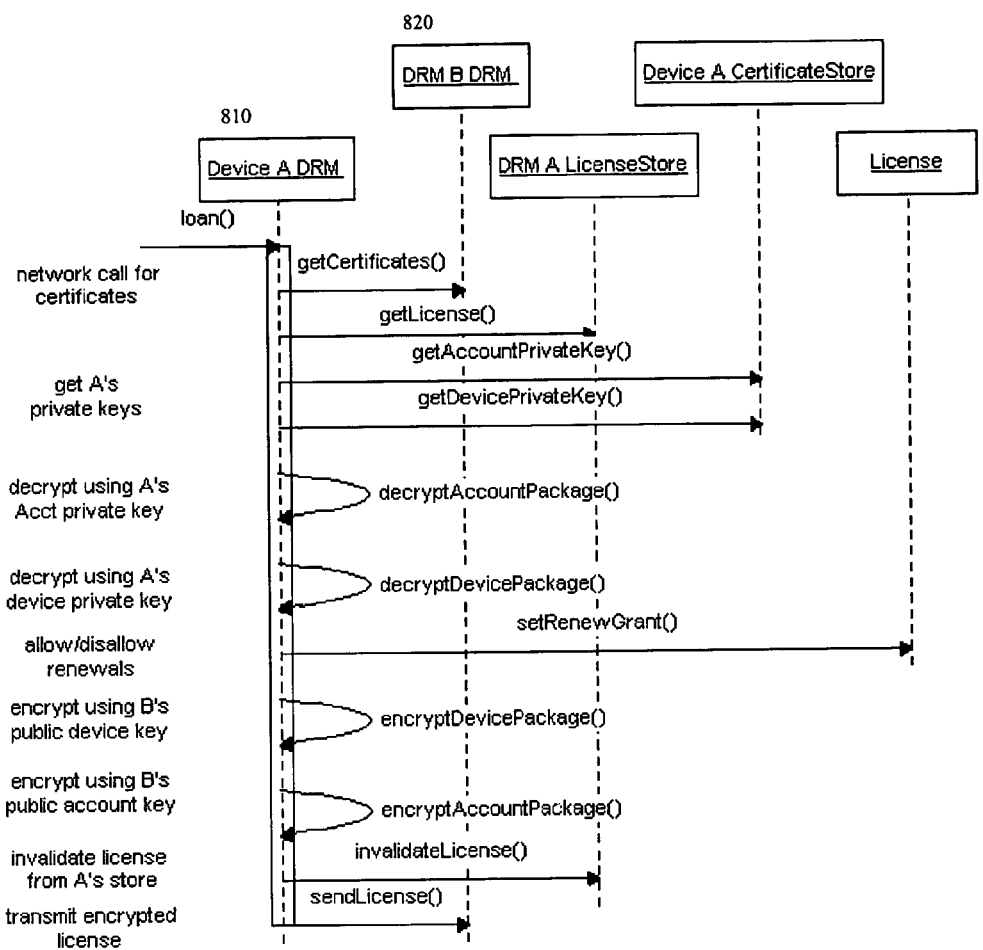
FIG. 8 is a UML diagram illustrating the loan of rights.

Referring to FIG. 7, to access content on the device, the DRM system (130) normally uses the Content key associated with the content file's Content ID. This key may be encased within the license (750). The DRM system must first obtain the private keys for the account and device (710). These values are stored on the device.

The Account Private key may be used to decrypt the Account Package of the Key (720). Once decrypted, the Device Private key may be used to decrypt the Device Package associated with the current device (730). Once decrypted, the content key may be available for the DRM system to follow its normal processing (740).

The extra Device Key processing becomes necessary in the context of a Federated Rights Management System to manage an Account's set of authorized devices.

Figure 9:
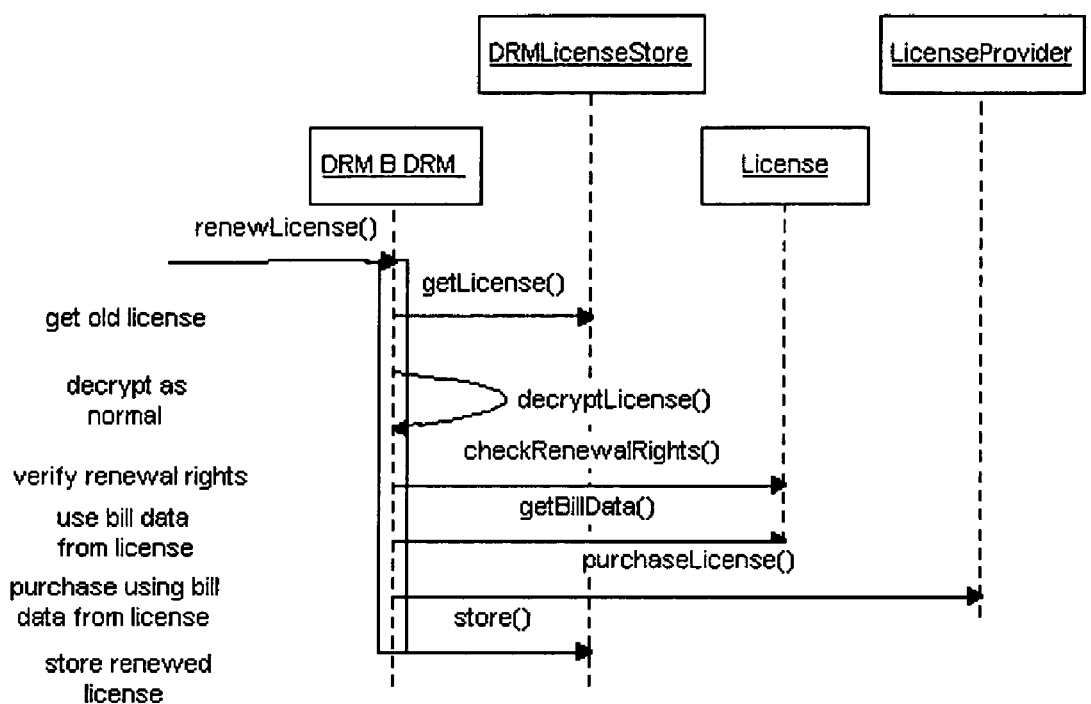
FIG. 9 comprises a representative diagram of one embodiment of the system. In the drawings.

Referring to FIG. 9, in this scenario, a user "A" wants to loan their license to another user "B". The "A" user must first have been granted the right to loan the content. When the content may be loaned, any rights within the license continue to be consumed by the "B" user.

To loan the content, the "A" DRM system (810) must acquire the certificates of the "B" user by making a network connection such as Bluetooth. The "A" DRM (810) decrypts the License as normal using its own private keys. The DRM system must then explicitly grant the right for the "B" user to "renew" the license by updating the license document. The license document and content key are then packaged back into a Device Package and encrypted using "B's" Device Public key. The result may be then encrypted to form the Account Package using "B's" Account Public key. The billing data for "A" and the Content ID are added to the license and the "A" user signs the entire key. The original license in "A's" store may be invalidated (denoted as loaned to prevent A's access). The key may be returned by executing the process in reverse. The invalidated key may be replaced with the returned key. Finally the newly built key may be transmitted to "B's" device where it may be stored in it's DRM License Store.

Referring to FIG. 9, when those rights expire, the "B" user can either return the expired key, renew the license using their own billing data, or even renew the license using the original owner's billing data as in the illustrated scenario.

This process closely follows the normal purchase content process. However in this case, the billing data off of the License may be used to purchase the content if the loaned user has been granted on the License the renewal right. In this case, the renewed license may be still "on loan" from the original rights owner but has been refreshed with additional rights (i.e., 50 more plays).

If the loaned license expires without the right to renew, the "B" user can use its own billing data to purchase their own license to the content. In this case, the new license is not "on loan", it belongs to the "B" user. The original license can be returned to the "A" user even though it has expired rights. The license can also be just purged from "B's" DRM license store and "A" can go purchase another license.

The invention claimed is:

1. A computer readable medium for accessing digital content, the computer readable medium having computer executable instructions stored thereon to configure a media device to perform the steps comprising:
    a. downloading a digital content package to said media device via a network;
    b. creating a license rights package including an account number and debitable parameters for accessing said digital content package, wherein said account number is associated with a consumer;
    c. executing a purchase of said license rights package;
    d. downloading said license rights package to a license storage on said media device;
    e. disconnecting the media device from the network;
    f. accessing the license storage on said media device;
    g. in response to an access request by a user, wherein the user and the consumer are different individuals, determining that said debitable parameters of said license rights package contain insufficient value;
    h. prohibiting access to said digital content package;
    i. prompting said user to purchase a renewed license rights package, wherein said renewed license rights package comprises at least a portion of said license rights package;
    j. receiving a request at the media device from said user to purchase said renewed license rights package;
    k. creating said renewed license rights package at the media device, the step of creating said renewed license rights package further comprising using metadata included with said license rights package to:
        i. calculate a cost for said renewed license rights package;
        ii. add available debitable parameters associated with said renewed license rights package; and
        iii. store a charge associated with said account number contained in said license rights package for said renewed license rights package;
    l. authorizing at the media device said renewed license rights package for use by said user prior to transmitting said charge to said host system; and
    m. selectively transmitting said charge to said host system at a time when said media device is connected to said host system.

2. The computer readable medium of claim 1, wherein said charge associated with said renewed license rights package is stored under an account number associated with the user.

* * * * *